United States Patent [19]

Mao

[11] Patent Number: 5,728,367
[45] Date of Patent: Mar. 17, 1998

[54] PROCESS FOR FABRICATING A LITHIATED TRANSITION METAL OXIDE

[75] Inventor: Zhenhua Mao, Duluth, China

[73] Assignee: Motorola, Inc., Schaumburg, Ill.

[21] Appl. No.: 816,812

[22] Filed: Mar. 18, 1997

Related U.S. Application Data

[63] Continuation-in-part of Ser. No. 663,415, Jun. 17, 1996.
[51] Int. Cl.[6] .............. C01D 9/04; C01G 1/02; C01G 51/04; C01G 53/04
[52] U.S. Cl. .......... 423/593; 423/395; 423/594; 423/599
[58] Field of Search .............. 423/593, 594, 423/599, 393, 395

[56] References Cited

U.S. PATENT DOCUMENTS

| | | | |
|---|---|---|---|
| 4,304,764 | 12/1981 | Joshi | 423/599 |
| 4,980,251 | 12/1990 | Thackeray et al. | 423/599 |
| 5,017,348 | 5/1991 | Lerner | 423/594 |
| 5,264,201 | 11/1993 | Dahn et al. | 423/594 |
| 5,308,720 | 5/1994 | Kurokawa et al. | 429/194 |
| 5,486,346 | 1/1996 | Fey | 423/594 |
| 5,531,920 | 7/1996 | Mao et al. | 252/182.1 |
| 5,591,548 | 1/1997 | Mao | 423/593 |

FOREIGN PATENT DOCUMENTS 198028   7/1992   Japan .................. 423/599

OTHER PUBLICATIONS

Jacobson, *Encyclopedia of Chemical Reactions*, vol. VI, p. 320 (1956), Reinhold Publishing Corporation.

Electrochemistry and Structural Chemistry of $LiNiO_2$ (R3M) for 4 volt Secondary Lithium Cells, J. Electrochem. Soc. vol. 140, No. 7, Jul. 1993, pp. 1862–1870, Jul. 1993.

*Primary Examiner*—Wayne Langel
*Attorney, Agent, or Firm*—Kelly A. Gardner; Ken Massaroni

[57] ABSTRACT

A method for preparing a lithiated transition metal oxide electrochemical charge storage material for use in an electrochemical cell. The cell (10) includes a cathode (20), an anode (30) and an electrolyte (40) disposed therebetween. The method involves the preparation of the lithiated transition metal oxide material in an inert environment. The materials are characterized by improved electrochemical performance, and a multiphase composition in which at least one phase is substantially crystalline, while a second phase is substantially amorphous. By-products of the process may be re-used by converting them into one of the starting materials for the preparation process.

8 Claims, 3 Drawing Sheets 5,728,367

PROCESS FOR FABRICATING A LITHIATED TRANSITION METAL OXIDE

CROSS REFERENCE TO RELATED APPLICATIONS

This application is a Continuation-in-Part of U.S. application Ser. No. 08/663,415, filed Jun. 17, 1996, by Zhenhua Mao, entitled "IMPROVED ELECTRODE MATERIAL FOR AN ELECTROCHEMICAL CELL AND METHOD OF MAKING SAME," and assigned to Motorola, Inc., abandoned.

TECHNICAL FIELD

This invention relates in general to secondary rechargeable electrochemical cells, and more particularly to secondary lithium electrochemical cells having high capacity positive electrodes.

BACKGROUND OF THE INVENTION

Secondary lithium electrochemical cells and particularly lithium batteries, using an intercalation compound as the positive electrode or cathode of the battery have been studied intensely during the past decade. Heretofore, the cathode material used in these batteries was typically a lithiated cobalt oxide, nickel oxide, or manganese oxide. Lithiated transition metal oxide batteries are being studied as an alternative to current nickel-cadmium and nickel-metal hydride cells because they possess several attractive characteristics, e.g. high cell voltage, long shelf life, a wide operating temperature range, and use of relatively non-toxic materials. The earliest reports of lithiated nickel oxide and lithiated cobalt oxide materials as positive electrode materials in rechargeable lithium batteries occurred more than a decade ago and is shown in, for example, U.S. Pat. Nos. 4,302,518 and 4,357,215 both to Goodenough, et al.

These materials have been intensively investigated and one of them, lithium cobalt oxide is currently used in commercial lithium ion batteries. Numerous patents have been issued for different improvements in these materials as the positive electrode for lithium cells. An example of a recent improvement is illustrated in U.S. Pat. No. 5,180,547 to VonSacken for "HYDRIDES OF LITHIATED NICKEL DIOXIDE AND SECONDARY CELLS PREPARED THEREFROM". The VonSacken reference teaches fabricating the hydroxides of lithium nickel dioxide fabricated in an atmosphere including a partial pressure of water vapor measuring about 2 torr. Regardless of the materials used in such cells, each material is synthesized in an oxidizing environment such as $O_2$ or air using nickel or cobalt and lithium containing salts. For example, a publication to Ohzuku, et al published in the Journal of the Electrochemical Society, Vol. 140, No. 7, Jul. 19, 1993, illustrates at Table I thereof the special processing methods for preparing lithiated nickel oxide. Each of the methods illustrated in the Ohzuku, et al reference show preparing the material in an oxidizing environment of either oxygen or air.

Charge and discharge of the materials fabricated according to these processes proceeds by a charge mechanism of deintercalation and intercalation of lithium ions from and into these materials. The materials synthesized by the prior art methods have a reversible capacity on the order of approximately 135 milliamperes (mAh/g). In other words, about 0.5 lithium ions can be reversibly deintercalated and intercalated from and into each mole of lithiated nickel oxide or lithiated cobalt oxide.

A significant amount of the capacity of these materials resides at potentials higher than about 4.2 volts versus lithium. If more than 0.5 lithium ions is removed from each of either lithiated nickel oxide or lithiated cobalt oxide, potentials higher than 4.2 volts versus lithium are required causing decomposition of most electrolytes. Further, removal of more than 0.5 lithium ions will result in irreversible changes to the structure of these materials, causing a decrease in the capacity during charge and discharge cycles. This result was reported in a publication by Xie, et al, presented at the Electrochemical Society Fall Meeting, 1994, Extended Abstract No. 102, Miami, Fla., October, 1994.

Reversible capacities of the most commonly used materials synthesized in $O_2$ and air atmospheres are very sensitive to residual, active lithium salts, such as $Li_2O$, $LiOH$, and $LiCO_3$, each of which result from the synthesis process. Moreover, the prior art processes tend to result in a single phase crystalline material, such as a single phase crystalline lithiated nickel oxide material. It is hypothesized that these artifacts of the prior art preparation process result in materials which have lower capacities than might otherwise be expected.

Accordingly, there exists a need to develop a new cathode material for rechargeable electrochemical systems which is fabricated of materials that are relatively environmentally friendly, may be fabricated at low temperatures, and which demonstrate performance characteristics superior to those of the prior art. Such materials should have higher capacity, i.e., greater than about 200 mAh/g at potentials of between 3.0 and 4.2 volts versus a Li metal. Such materials should also have a relatively easy synthesis process which is highly controllable, and which demonstrates insensitivity to residual lithium salts. Any by-products of the manufacturing process should be either environmentally acceptable, reprocessable into other products, or both. Finally, the material should have a high initial charge efficiency and be highly reversible charge/discharge reaction so as to provide a material of good cycle life.

DETAILED DESCRIPTION OF THE PREFERRED EMBODIMENT

Figure 1:
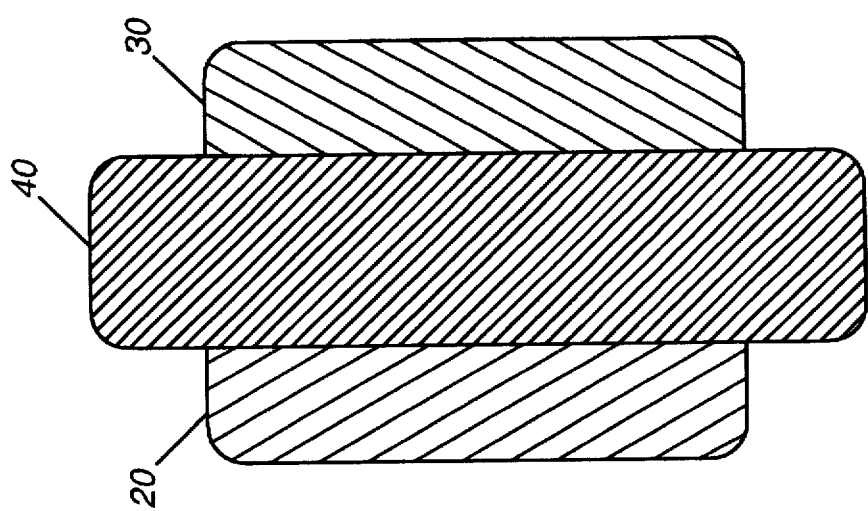
FIG. 1 is a schematic representation of an electrochemical cell including an electrode in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a schematic representation of an electrochemical cell 10 including a lithiated transition metal oxide electrode in accordance with the instant invention. The electrochemical cell includes a positive electrode 20 and a negative electrode 30 and has an electrolyte system 40 disposed therebetween.

The electrochemical cell 10 further includes a positive electrode fabricated of a transition metal oxide such as a nickel oxide or a cobalt oxide electrochemical charge storage material which is described in greater detail hereinbelow.

The negative electrode 30 or anode of the cell may be fabricated from a material selected from the group consisting of, but not limited to, lithium metal, lithium alloying metals, such as aluminum, tin, and bismuth, carbon (including graphite and petroleum coke), low voltage lithium intercalation compounds such as $TiS_2$, $V_6O_{13}$, $MoS_2$, and combinations thereof. Alternatively, the negative electrode 30 may be fabricated of the pyrolysis reaction product of multifunctional organic monomers, such as is disclosed in, for example, U.S. patent application Ser. No. 08/534,427 by Zhang, et al, entitled "Carbon Electrode Materials for Electrochemical Cells and Method of Making Same", filed Sep. 27, 1995; U.S. patent application Ser. No. 08/600,388, a Divisional application of Ser. No. 08/534,427, filed Feb. 12, 1996; and U.S. Pat. No. 08/561,641 entitled "Improved Carbon Electrode Materials For Lithium Battery Cells And Method of Making Same" filed Nov. 22, 1995, by Zhang, et al; and U.S. patent application Ser. No. 08/534,427 entitled Carbon Electrode Material for Electrochemical Cells and Method of Making Same, filed Sep. 27, 1995, by Zhang, et al, and all assigned to Motorola, Inc.

The electrolyte may be either a solid, a gel, or a liquid electrolyte system. Further, the electrolyte may be either an aqueous or nonaqueous electrolyte system. The electrolyte 40 may also act as a separator between a positive and negative electrodes. In one preferred embodiment, the electrolyte is fabricated of a material such as is disclosed in commonly assigned copending U.S. patent application Ser. No. 08/518,732 entitled Blended Polymer Gel Electrolytes in the name of Oliver, the disclosure of which is incorporated herein by reference, as well as U.S. patent application Ser. No. 08/638,706 entitled Polymer Gel Electrolytes, to Oliver, et al. filed Apr. 29, 1996.

In accordance with the instant invention, there is provided a method for fabricating a lithiated transition metal oxide material which is capable of storing and discharging electrical charge. The material disclosed herein is therefore useful as the cathode in lithium rechargeable batteries. The stabilized material has the formula $Li_xTM_yO_2$, where TM is a transition metal selected from the group of nickel or cobalt and combinations thereof; $0.98 \leq x \leq 1.1$; and $0.98 \leq y \leq 1.1$. The electrode material is a multiphase electrode material having at least one phase which is a substantially crystalline phase having the formula $LiTMO_2$ and having a second phase being substantially amorphous. The amorphous phase comprises between 10 and 50% of the total electrode material. Other phases of crystalline, microcrystalline, polycrystalline or amorphous material, may also be included in the electrode material. The electrode material may further include one or more modifiers selected from the group of titanium, bismuth, iron, zinc, chromium, and combinations thereof. In one preferred embodiment, the electrode material is $LiNiO_2$, and includes a first crystalline phase having the formula $LiNiO_2$, and a second substantially amorphous phase which is Li rich as compared to Ni. In this preferred embodiment, the amorphous phase comprises between 20 and 35% of the material.

Figure 2:
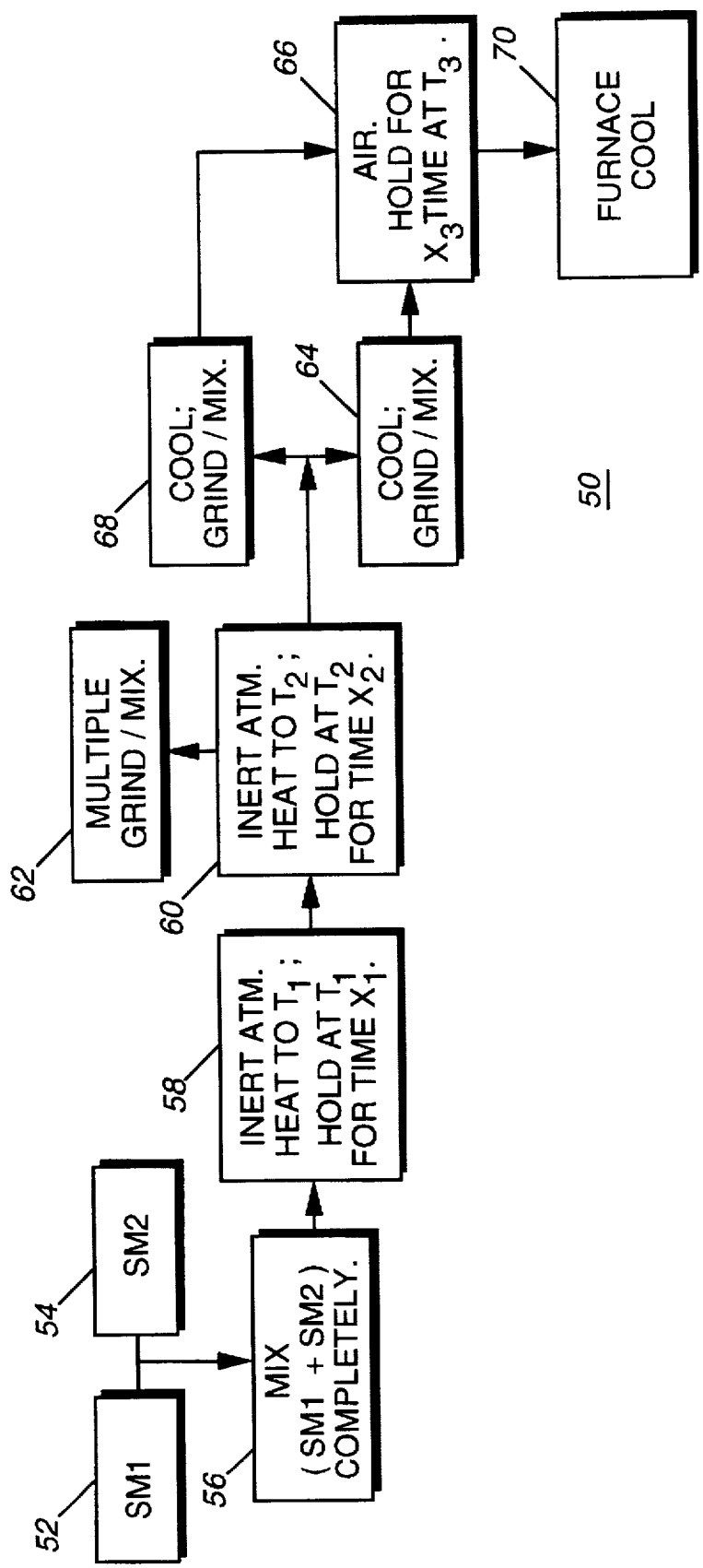
FIG. 2 is a flowchart illustrating the steps for preparing a lithiated transition metal oxide material in accordance with the instant invention.

Referring now to FIG. 2, there is illustrated therein a flowchart of the steps for preparing a lithiated nickel oxide material as described hereinabove. The flowchart 50 illustrates at box 52 the step of providing a first precursor lithium containing material sm1. In a preferred embodiment, the lithium containing precursor material is a nitrate salt and hence is preferably lithium nitrate. Box 54 illustrates the step of providing a second precursor material sm2. The second precursor material is preferably a transition metal hydroxide, and in the embodiment in which the end product is a lithiated nickel oxide, the starting material provided at Box 54 is a nickel hydroxide. This specific nickel hydroxide material can be any one of a number of a different types of materials, and in one preferred embodiment is an "aged" β-phase nickel hydroxide material. Alternatively, the material provided at Box 54 may be selected from the group consisting of NiO, $NiCO_3$, $Ni(NO_3)_2 \cdot 6H_2O$, $Ni(OH)_2$, CoO, $Co(OH)_2$, and combinations thereof.

Thereafter, as is illustrated in Box 56 of FIG. 2, is the step of mixing the precursor materials provided at Boxes 52 and 54. The mixing should be complete, and may be carried out in commonly used mixing devices. Thereafter, the materials are reacted, as by heating, as described in Box 58 of flowchart 50. The conditions and environments in which the heating takes place is important to forming material having a high capacity as illustrated herein. More particularly, the mixed materials are heated in an inert environment. By an inert environment, it is meant that the principal components of the atmosphere in which the heating takes place are not reactive with the precursor materials therein. Accordingly, the heating illustrated in step 58 of Flowchart 50 is carried out in a helium, nitrogen, or argon environment.

The heating generates reaction conditions, and preferably takes place in a nitrogen atmosphere at temperatures of about 500°–800° C. However, prior to that heating, as is illustrated in Box 58, is the step of preheating the material to a temperature $T_1$, for a first period of time, $X_1$. $T_1$ is typically between about 200°–400° C., while $R_1$ is typically a first rate and is on the order of 2°–5° C. per minute. Alternatively, the mixed precursor material may be placed directly into an oven preheated to $T_1$, from room temperature. Thereafter, the materials are held at temperature for a period of time, $X_1$, between approximately 1 and 10 but preferably three hours time. It is important to note that step 58 takes places in an inert atmosphere.

After heating at temperature $T_1$ for period of time, $X_1$, the material is heated to a second temperature $T_2$, for a second period of time, $X_2$. $T_2$ is typically on the order of approximately 500°–650° C., and preferably about 610° C. $X_2$ is a time period which is typically on the order of between 5 and 40 hours and preferably about 20 hours. The oven is ramped from $T_1$ to $T_2$ at a rate of approximately between 1 and 10° C. per minute, and preferably about 2° C. per minute. This heating is maintained under the inert atmosphere described hereinabove with respect to step 58. Optionally, material may be added to the heating at this step and time as is illustrated by Box 62. More specifically, it has been found that if only approximately 80% of the total materials to be reacted by the process illustrated in FIG. 2, are introduced at steps 52 and 54, while the remaining 20% is introduced at Step 62, the reaction products and the performance characteristics of the reaction product are improved. It is also important to note that by-products found at this step may be reprocessed into one of the precursor materials of box 52, in a process described below in FIG. 3.

Thereafter as is illustrated in Box 64, the materials are cooled to room temperature and subjected to a grinding and mixing process which may be carried out in a conventional mill. Thereafter, the materials may be taken from room temperature up to temperature $T_3$, which is typically between 600°–700° C. and preferably about 650° C. Thereafter, the materials are heated in air for a certain period of time $X_3$ of between 1 and 20 hours and preferably approximately 8 hours. This step is illustrated by box 66 of FIG. 2 and is preferably carried out in an air atmosphere.

Alternatively, after the cooling and grinding steps such as that shown in Box 64, the materials may be introduced into an oven already at temperature $T_3$ and in an air environment.

Following heating as illustrated in Box 66, the materials are allowed to cool to room temperature by simply removing them from the oven and leaving them in a room temperature environment until the temperature has fallen. This is illustrated at Box 68 of FIG. 2.

Figure 3:
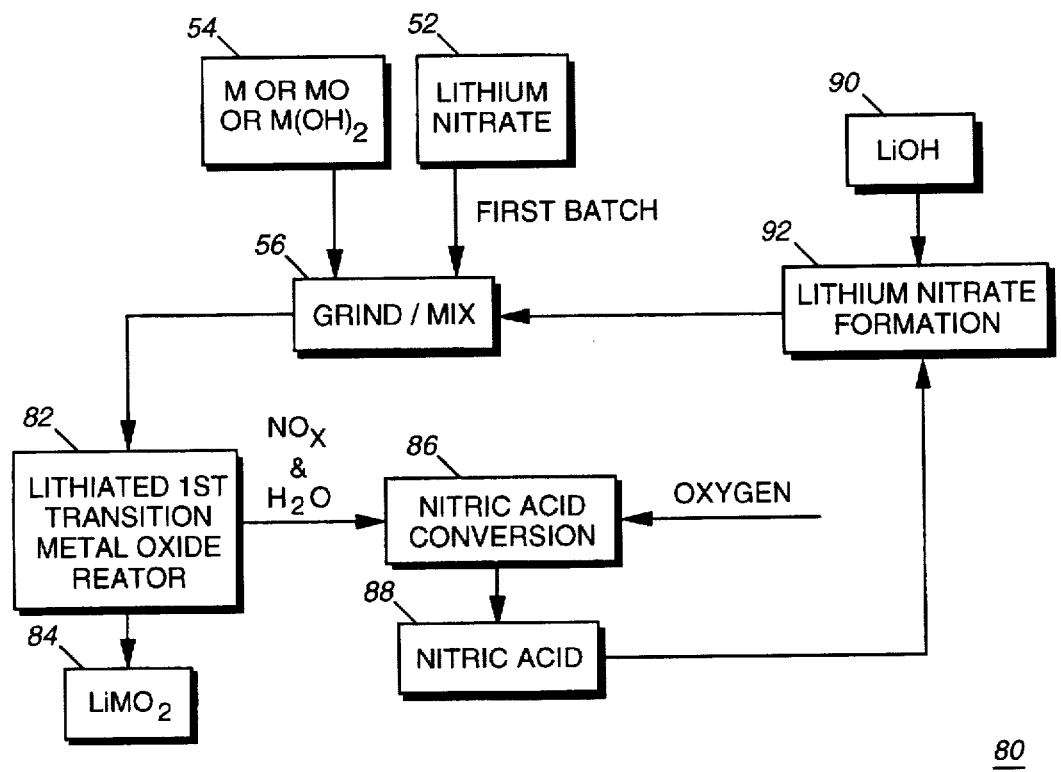
FIG. 3 is a flowchart illustrating the steps for reprocessing by products of the manufacturing process described in FIG. 2.

Referring now to FIG. 3, there is illustrated therein a flowchart 80 of the steps for reprocessing by-products of the process of FIG. 2 into new starting or precursor materials. The heating steps of boxes 58 and 60 of FIG. 2 are represented by Box 82 of FIG. 3, with a lithiated transition metal oxide being one output of the reaction, as illustrated by box 84. However, an additional output of box 82 is nitrogen oxide gases ($NO_x$) which when using $Ni(OH)_2$ and $LiNO_3$ as starting materials, are formed according to the following reaction:

$$Ni(OH)_2 + LiNO_3 \rightarrow LiNiO_2 + NO_2 + H_2O \quad (I)$$

Indeed, for every metric ton of $LiNiO_2$ formed according to the above reaction, about 470 kilograms of $NO_2$ will be generated. Environmental Protection Agency regulations forbid the release of $NO_2$ gases in amounts greater than about 23 parts per million. Accordingly, disposal of such gases is an issue.

The instant inventor has found that the $NO_x$ gases may be reprocessed into environmentally friendly, reusable chemical products. The $NO_x$ and $H_2O$ product of reaction (I) above may be converted to nitric acid, as shown in box 86, according to the following reaction:

$$3NO_2 + H_2O \rightarrow 2 HNO_3 + NO \quad (II)$$

and the NO product can be instantly oxidized into $NO_2$, by exposure to oxygen gas as follows:

$$2NO + O_2 \rightarrow 2NO_2 \quad (III)$$

for further processing into $HNO_3$. Nitric acid ($HNO_3$) is an environmentally acceptable, chemical industry commodity for which there is great demand. It is hence an environmentally and economically acceptable means by which to reprocess $NO_2$.

The conversion of $NO_x$ to nitric acid in box 86 yields $HNO_3$ at box 88 of FIG. 3. This does not, however, necessarily end the reprocessing. It is known that lithium hydroxide (LiOH) is a cheaper lithium source than $LiNO_3$, though does not yield the same result in the process described in FIG. 2. However, by adding LiOH, as in box 90, to the $HNO_3$ generated at box 88, $LiNO_3$ can be easily formed at box 92, according to the following reaction:

$$HNO_3 + LiOH \rightarrow LiNO_3 + H_2O$$

The resulting $LiNO_3$ can then be used as the precursor material of box 52, added and mixed with the material of box 54 of FIG. 2, to restart the process of FIG. 2. This is believed to be a much more environmentally friendly and economically acceptable use of the process by-products, than simply disposing of the waste $NO_x$ generated in box 82.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A process for fabricating a lithiated transition metal oxide from the heating and oxidation of a lithium nitrate and a transition metal oxide in which a by-product of the process is an $NO_x$ gas, wherein the $NO_x$ by-product is first treated to generate nitric acid ($HNO_3$), which nitric acid is then reacted with lithium hydroxide (LiOH) to form said lithium nitrate.

2. A process as in claim 1, wherein the $NO_x$ is treated with $H_2O$ to form $HNO_3$ and a NO.

3. A process as in claim 2, wherein the NO is treated with $O_2$ to form $NO_2$.

4. A process as in claim 3, wherein the $NO_2$ is treated with $H_2O$ to form $HNO_3$.

5. A process for fabricating a lithiated transition metal oxide from the heating and oxidation of a lithium nitrate and a transition metal hydroxide in which a by-product of the process is an $NO_x$ gas, wherein the $NO_x$ gas is first treated to form nitric acid ($HNO_3$), which nitric acid is then reacted with lithium hydroxide (LiOH) to form said lithium nitrate.

6. A process as in claim 5, wherein the $NO_x$ is treated with $H_2O$ to form said $HNO_3$ and NO.

7. A process as in claim 6, wherein said NO is treated with $O_2$ to form $NO_2$.

8. A process as in claim 7, wherein said $NO_2$ is treated with $H_2O$ and LiOH to form said lithium nitrate.

* * * * *